No. 778,056.	Patented December 20, 1904.

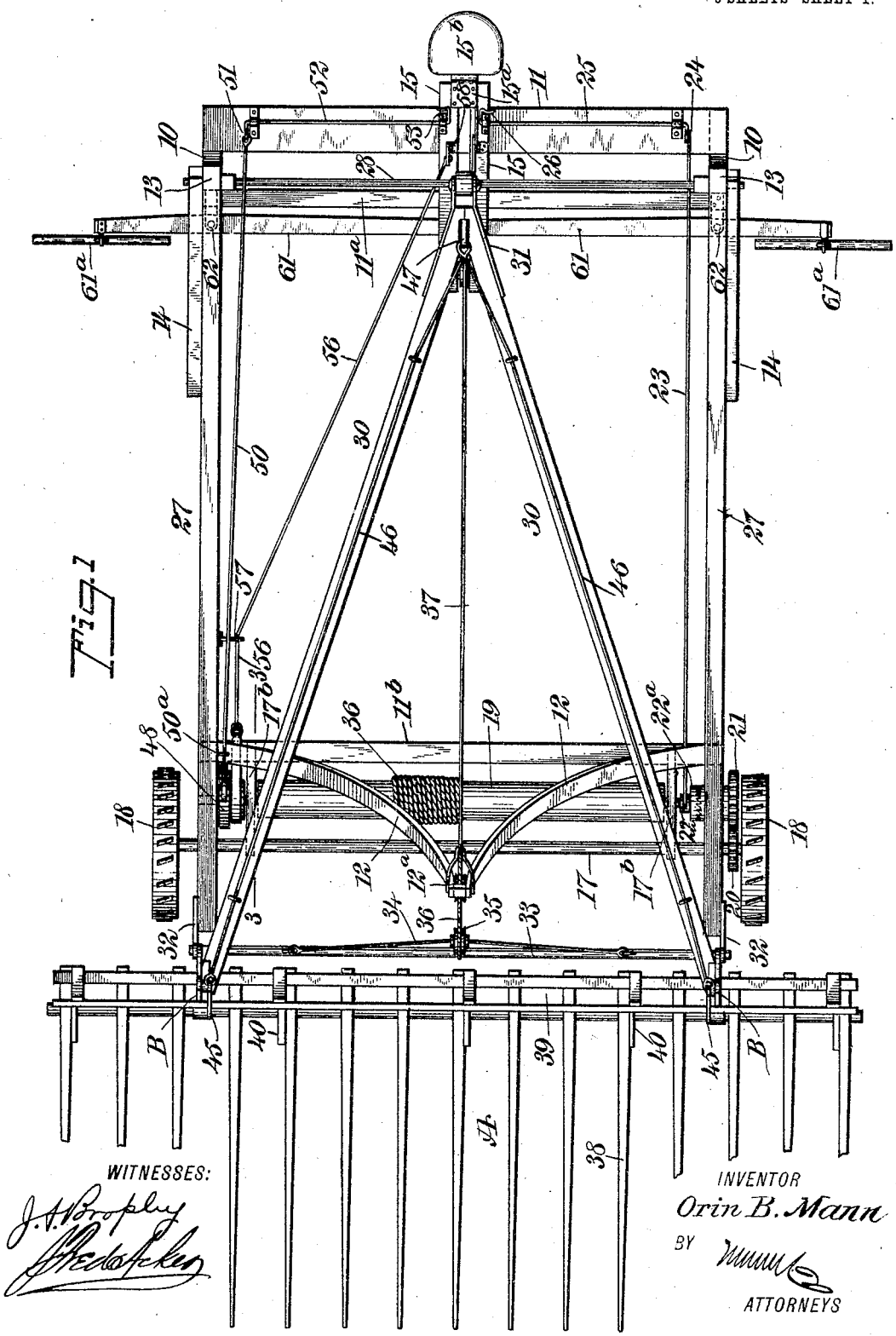

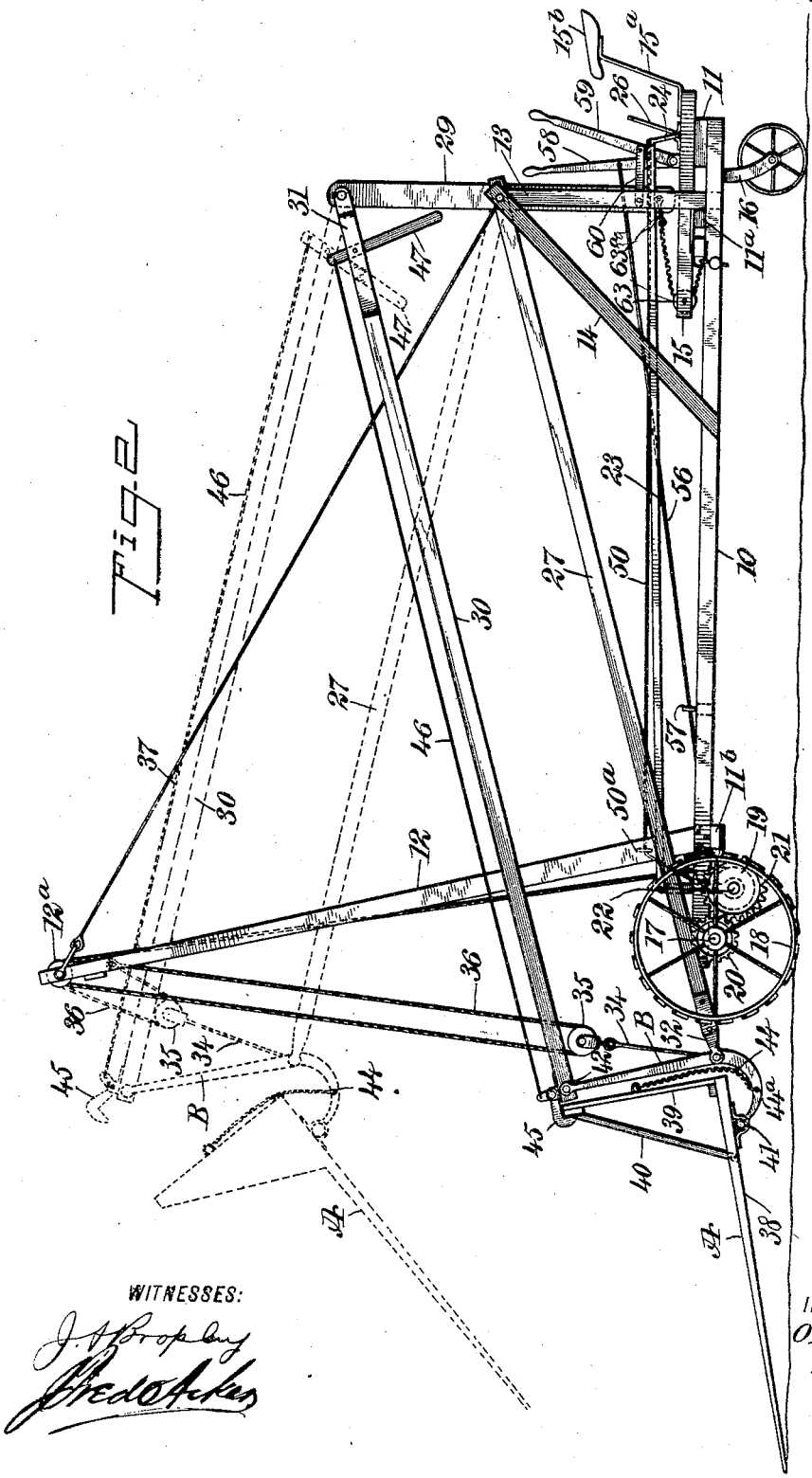

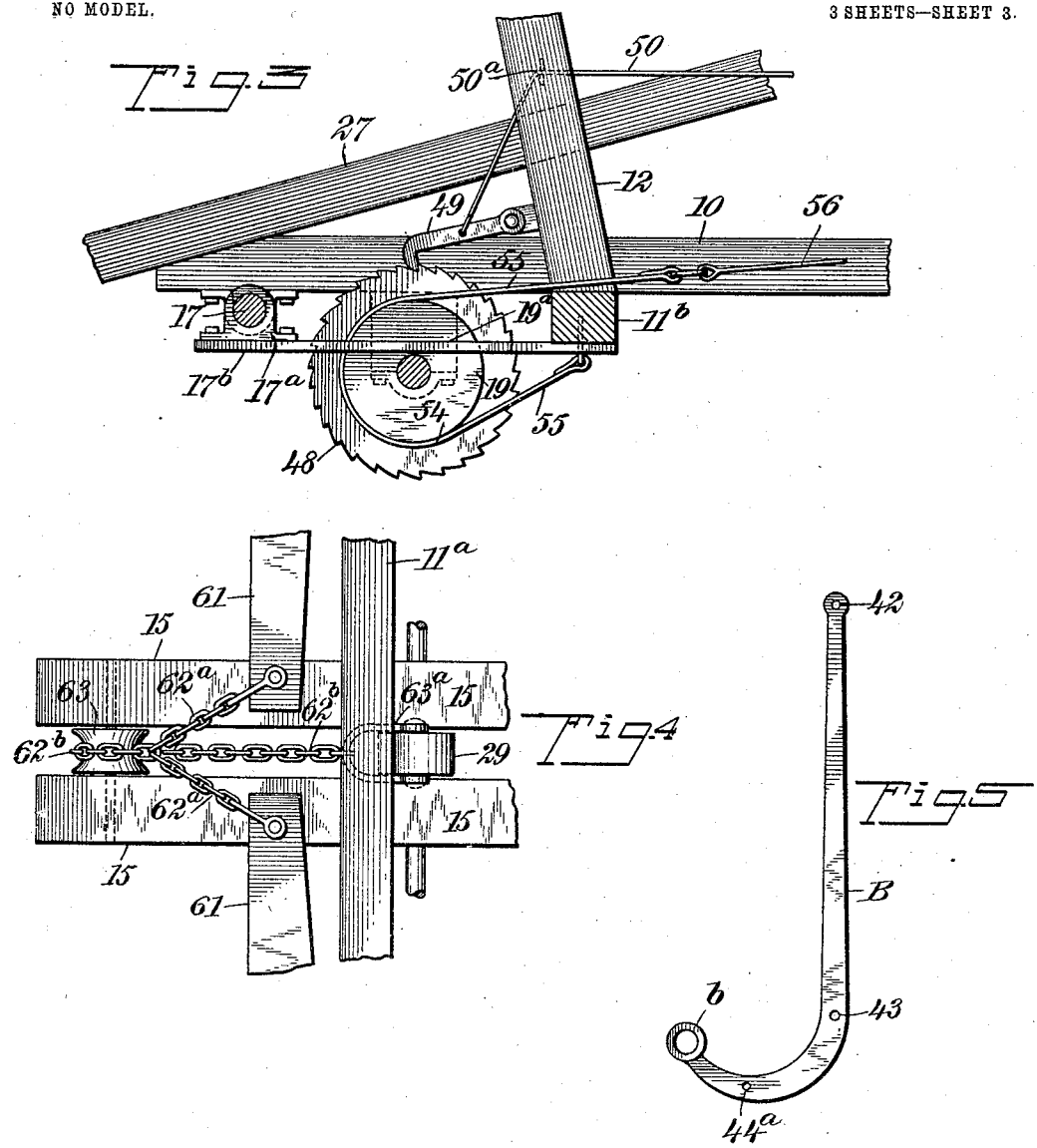

UNITED STATES PATENT OFFICE.

ORIN B. MANN, OF MEETEETSE, WYOMING.

HAY RAKE AND STACKER.

SPECIFICATION forming part of Letters Patent No. 778,056, dated December 20, 1904.

Application filed February 26, 1904. Serial No. 195,378.

*To all whom it may concern:*

Be it known that I, ORIN B. MANN, a citizen of the United States, and a resident of Meeteetse, in the county of Bighorn and State of Wyoming, have invented a new and Improved Hay Rake and Stacker, of which the following is a full, clear, and exact description.

The purpose of my invention in to provide a hay rake and stacker which will be simple, durable, and economic and so constructed that the rake will gather up the hay as the machine advances, and when a load is obtained the rake may be raised, so that its load will not trail upon the ground while the machine is being drawn to the stack, and, further, when the stack is reached the rake can be elevated as high as desired, held in its elevated position, and its load discharged.

Another purpose of the invention is to so construct the operative parts of the machine that they will be completely under the control of the driver.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved machine. Fig. 2 is a side elevation of the same, showing the rake and parts carrying it in the gathering position in positive lines and in an upper discharging position in dotted lines. Fig. 3 is a detail view of a ratchet mechanism employed in connection with the elevating devices for the rake and a partial longitudinal section through the frame of the machine, which section is taken on the line 3 3 in Fig. 1. Fig. 4 is a bottom plan view of that portion of the machine at which the longer members of the draft devices approach each other, and Fig. 5 is a detail side elevation of one of the supports on which the rake has raking movement.

The frame of the machine, as shown, usually consists of side bars 10 and a rear bar 11, together with an intermediate bar $11^a$, near the rear bar 11, and a front bar $11^b$, which is located near the forward ends of the side bars 10. In the further construction of the frame standards 13 are provided, which extend upward from the side bars 10 near their rear ends, and braces 14, attached to the upper ends of the standards and to the side bars 10 at a point near their centers. In the further construction of the frame a derrick 12 is erected near the forward end of the frame, which derrick has a slight forward inclination, and at the upper end of this derrick, the members of which closely approach each other at their upper ends, a pulley $12^a$ is mounted to turn. Also in constructing the frame longitudinal parallel sills 15 are secured to the rear cross-bar 11 and adjacent cross-bar $11^a$, the said sills being located at the central portion of said cross-bars, and the shank $15^a$ of the driver's seat $15^b$ is secured in any suitable or approved manner at the rear end portions of the said sills 15, as is shown in Figs. 1 and 2. The rear portion of the frame is supported by caster-wheels 16, located near each side, and at the forward end of the frame an axle 17 is journaled in suitable bearings $17^a$, secured to the under side portions of the side beams 10, and plates $17^b$ are secured to the said bearings and to the front cross-bar $11^b$, one of which plates is shown in Fig. 3. This shaft or forward axle 17 is provided with a driving-wheel 18 at each of its ends, and at the left-hand side of the axle 17 a gear 20 is firmly secured. This gear 20 may be brought in mesh with a gear 21, loosely mounted on the shaft 22 of a drum 19, journaled in suitable bearings $19^a$ at the rear of the axle 17. The said gear 21 is provided with a suitable clutch-face adapted for engagement with a clutch $22^a$, operated on the drum-shaft by means of a rod 23 and proper connections, which rod in its turn is pivotally attached to a crank-arm 24 at the outer end of a foot-lever 25, located on the rear beam 11, which lever 25 has an upturned section 26 within convenient reach of the left foot of the driver when seated.

A lower set of arms 27 is employed, which arms are pivoted at their rear ends to the uprights 13 or to any other convenient support, and the arms 27 are of sufficient length to extend out beyond the ends of the side bars 10 of the main frame, having normally a downward and forward inclination, as is shown in Fig. 2. A bar 28 extends from standard to standard of the main frame at the rear, and on this bar a shifting-lever 29 is fulcrumed at or about its center, and the said shifting-lever 29 occupies normally the vertical position. (Shown in Fig. 2.) Another set of arms 30 is employed in connection with the lower set 27; but the arms of the upper set are pivotally attached by suitable straps 31 to the upper end of the shifting-lever 29, as is clearly shown in Fig. 1. The arms of the upper set 30 diverge as they extend in direction of the rake A and at their forward extremities are brought practically over the corresponding ends of the arms 27 of the lower set, which latter arms at their forward ends are provided with forwardly-extending straps 32, and a shaft 33 is passed through the outer ends of these straps and secured thereto.

A yoke 34 extends from the shaft 33, and at the central portion of this yoke a pulley 35 is located, and a lifting rope, chain, or cable 36 is attached at one end to the upper portion of the derrick 12 and is then passed downward around the pulley 35, as is shown in Fig. 2, and then upward around the pulley 12$^a$ at the upper portion of the derrick 12, and down again to an attachment to the drum 19, so that when the gear 21 is thrown in mesh with the gear 20 the drum 19 is set in motion to wind up the cable 36, and thus elevate the two sets of arms 27 and 30 at their forward ends. The derrick 12 is supported by a link or cable 37 attached thereto and to any desired point at the rear of the structure.

The arms 27 and 30 are adapted to carry a rake A, and the rake is connected in a pivotal and dumping manner with the said arms, as will hereinafter appear. The rake A consists of the usual teeth 38 and an upright head 39, and braces 40 connect the head and the teeth of the rake at various points, and further bearings 41 are secured to the under face of the teeth of the rake near the end portions of the rake, as is shown in Fig. 2. The rake A is connected with the lower and upper set of arms 27 and 30 through the medium of hangers B, which, as is shown in Fig. 5, have a straight body-section and forwardly and upwardly curved bottom sections, which bottom sections terminate in eyes $b$ for coöperative operation with the bearings 41. At the upper end of each hanger B an eye 42 is formed, by means of which the hangers are secured to the forward portion of the upper set of arms 30, and near the lower curved portions of the hangers apertures 43 are produced adapted to receive the ends of the shaft 33, which likewise passes through the side straps 32, secured to the lower set of arms 27. It will thus be observed that the rake A is pivoted upon the hangers B, and by reference to Fig. 2 it will be further observed that chains 44 are attached to the hangers B at points 44$^a$ in the lower curved portions of the hangers and to the head 39 of the rake A, which chains act to limit the downward movement of the rake when in dumping action, as is illustrated by dotted lines in Fig. 2. Latches 45 are pivoted upon the forward ends of the upper set of arms 30, adapted to engage with the head 39 of the rake A and keep the latter in working position; but when the rake is to be released to dump its load the latches 45 are withdrawn from connection with the rake-head by rod or other connections 46, leading along the upper portion of the upper set of arms 30 to a lever 47, pivoted at the intersection of the arms of the said upper set 30, as is indicated in Figs. 1 and 2.

At the right-hand end of the drum 19 a ratchet-wheel 48 is secured, the teeth whereof are engaged by a detent 49, pivoted to the frame, as is clearly shown in Fig. 3, and the detent is lifted from engagement with the ratchet-wheel whenever desired by connecting a rope or chain 50 with the detent and leading it through guides 50$^a$ to a connection with a crank-arm 51 at the outer end of a rock-shaft 52, mounted to turn upon the rear cross-bar 11 of the frame, as is shown in Fig. 1, which shaft is provided with an upturned foot member 53 adjacent to the right-hand side of the driver's seat, as is also shown in Fig. 1. This detent and ratchet-wheel serve to hold the drum 19 stationary when the rake has been raised as far as desired by the action of the drum when the gears 20 and 21 are in mesh. When the rake is to be lowered from its elevated to its normal position, it is desirable that the rapidity of its descent should be under control. To that end I provide a circular boss 54 on the ratchet-wheel 48, and this boss is peripherally engaged by a strap-brake 55, secured to the frame of the machine at one end, and at its other end the said strap-brake is attached to a band 56, link, rope, or its equivalent, which is carried through suitable guides 57 to the rear of the machine and is connected with a lever 58 within convenient reach from the driver's seat 15$^b$, and located, preferably, at the right-hand side of the driver's seat, as illustrated in Fig. 1, so that in the operation of the machine as far as described, after the rake A has received its load the gears 20 and 21 are placed in engagement by the action of the lever 25, at which time the drum 19 is set in action and the loaded rake is raised as high as may be desired. The lever 25 is then again operated to disconnect the gears 21 and 20, leaving the loaded rake in its elevated position, and the machine is then drawn to the stack or to the place where the stack is to be made, and the driver will operate the lever 47, connected with the latches 45, to disengage the latches from the rake-head, permitting the rake to dump or spill its load, as is shown in Fig. 2. When the machine is again brought to a position to take up another load, the rake is lowered, and at such time the detent 49 is carried out of engagement with the teeth of the ratchet-wheel 48 of the drum 19 by the driver placing his foot on the upturned portion 53 of the controlling shaft or lever 52, and while the detent 49 is held out of engagement with the ratchet-wheel 48 the driver, by gripping the lever 58 and operating the same, can apply the brake 55 to the said brake more or less tightly, so as to regulate the rapidity of the descent of the rake.

The shifting-lever 29 is moved at its bottom portion by means of a hand-lever 59, which is connected with the bottom portion of the said shifting-lever 29 by a suitable link 60, as is shown in Fig. 2, and the lever 58 may be used in connection with any suitable form of rack to hold it in adjusted position. This lever 59 is utilized to carry the rake upward from the ground as high as may be desired to overcome inequalities in the ground over which the rake is to pass, and to hold the rake A at such an elevation from the ground after it has received its load as will prevent the hay from dragging on the ground, the rake then being in position to be readily transported to the stack and afterward raised as high as may be desired for dumping purposes by the action of the drum 19, in the manner heretofore described; but the rake A is automatically carried from direct engagement with the ground by the action of the numerous pulling devices, two of which are employed at each side of the machine. To that end two draft devices are employed, each consisting of a long draft-tree 61, fulcrumed at a point 62 between its center and outer end on the frame of the machine, as is indicated in Fig. 1, and the inner ends of these long draft-trees approach each other preferably at a point beneath the sills 15, as is illustrated in Fig. 4. Each draft device is completed by the addition of a singletree 61$^a$ to the outer end portion of each longer draft-tree 61. The two draft-trees 61 have chains 62$^a$ attached thereto, and the chains 62$^a$ of each draft-tree are brought together and are connected with a single chain 62$^b$, which single chain is passed upward over a friction-pulley 63, located between the forward portions of the sills 15, as is shown in Fig. 4, and the other end of the said single chain 62$^b$ is attached in any suitable or approved manner to the bottom portion of the shifting-lever 29, as shown at 63$^a$ in Figs. 2 and 4. Under this arrangement it is evident that as soon as the animals commence to pull on the draft devices the lower end of the shifting-lever 29 will be drawn forward and the members of the arms 27 and 30 will be elevated sufficiently at their forward ends to raise the rake from the ground and sufficiently to prevent the teeth of the rake from engaging with the ground under ordinary conditions of service. If it is necessary to raise the rake to overcome obstructions—such as large rocks, stumps, and the like—it is done by manipulation of the lever 59, hereinbefore described. In this connection it may be stated that the bar 11$^a$ serves to limit the backward movement of the drafttree 61.

Having thus described my invention, I claim as new and desire to secure by Letters Patent—

1. In a hay rake and stacker, a portable frame, arms pivotally connected with the rear portion of the frame, hangers having curved lower terminals, the body portions of which hangers connect the arms, a rake pivoted to the lower curved portions of the hangers, latch devices for the rake carried by sundry of the arms, a lifting device for the arms and the rake, and means for operating the lifting device and the latches, as set forth.

2. In a hay rake and stacker, a wheel-supported frame, a lever pivoted on the frame, having normally a vertical position, carrying-arms attached to the said lever, hangers having forwardly-curved lower terminals, the body portions of which hangers connect the forward ends of the carrying-arms, a rake pivoted to the curved lower portion of the said hangers, latches for the rake carried by sundry of the said arms, means for operating the said latches, means for moving the lower portion of the lever with which the carrying-arms are connected, a lifting device for the carrying-arms, including cables operated by the movement of the wheels of the said frame, and a clutch mechanism for carrying the cables into and out of action, as described.

3. In a hay rake and stacker, a wheel-supported frame, standards carried from the rear portion of the frame, a lever, normally in vertical position, supported by the said standards, upper and lower carrying-arms respectively pivotally connected with said lever and its support, hangers connecting the forward ends of the upper and the lower carrying-arms, a rake-head, latches for the rake-head, and a releasing device for the said latches, as described.

4. In a hay rake and stacker, a wheel-supported frame, standards carried from the rear portion of the frame, a lever normally in vertical position supported by the said standards, upper and lower carrying-arms respectively pivotally connected with the said lever and its support, supports connecting the forward ends of the upper and lower carrying-arms, a rake pivoted on the said supports, latches carried by the upper carrying-arms and arranged for engagement with the head of the rake, a releasing device for the said latches, chains connected with the rake-head and with the supports for the rake, limiting its dumping movement, and a hoisting device for the said rake and its carriers.

5. In a hay rake and stacker, pivoted carrying-arms, a rake, hangers pivotally connecting said arms and pivotally supporting said rake, latches for the head of the rake, a wheeled support on which the carrying-arms are located, a drum operated by the movement of sundry of the supporting-wheels of said frame, a derrick carried by the frame, and a lifting-tackle connected with the drum and with the carrying-arms, being supported by said derrick, for the purpose described.

6. In a hay rake and stacker, pivoted carrying-arms, a rake, hangers having straight body portions pivoted to said arms, and forwardly and upwardly curved lower portions, the terminals of the curved portions of the hangers being pivoted to the head of the rake, a wheeled frame on which the carrying-arms are located, a drum operated by the movement of sundry of the supporting-wheels of the frame, a derrick carried by the said frame, a lifting-tackle connected with the drum and with the carrying-arms and supported by the said derrick, a detent mechanism for the said drum, comprising strap-brakes acting on the drum, ratchets carried by the drum, pawls acting on the ratchets, and means for independently operating the said brakes and the said pawls, as described.

In testimony whereof I have signed my name to this specification in the presence of two subscribing witnesses.

ORIN B. MANN.

Witnesses:
   ATWOOD C. THOMAS,
   EVA BURNETT.